(12) United States Patent
Jäger

(10) Patent No.: US 8,940,385 B2
(45) Date of Patent: Jan. 27, 2015

(54) FILM WITH REINFORCED BORDERS AND EDGES

(75) Inventor: Norbert Jäger, Lauterbach (DE)

(73) Assignee: Duo-Plast AG, Lauterbach (DE)

( * ) Notice: Subject to any disclaimer, the term of this patent is extended or adjusted under 35 U.S.C. 154(b) by 405 days.

(21) Appl. No.: 12/682,589

(22) PCT Filed: Oct. 8, 2008

(86) PCT No.: PCT/EP2008/008476
§ 371 (c)(1),
(2), (4) Date: Jul. 9, 2010

(87) PCT Pub. No.: WO2009/049804
PCT Pub. Date: Apr. 23, 2009

(65) Prior Publication Data
US 2010/0291352 A1  Nov. 18, 2010

(30) Foreign Application Priority Data
Oct. 10, 2007 (EP) .................................... 07019778

(51) Int. Cl.
*B32B 3/00* (2006.01)
*B32B 3/02* (2006.01)
*B32B 37/00* (2006.01)
*B29C 65/00* (2006.01)
*B32B 37/22* (2006.01)

(52) U.S. Cl.
CPC ........... *B32B 37/0076* (2013.01); *B32B 37/223* (2013.01); *B32B 2553/00* (2013.01)

USPC ........... 428/189; 428/157; 428/192; 156/269; 156/302; 156/510

(58) Field of Classification Search
USPC .................... 428/156, 157, 192, 45, 47, 189; 156/269, 302, 510
See application file for complete search history.

(56) References Cited

U.S. PATENT DOCUMENTS

| 3,957,558 A | 5/1976 | Lee et al. |
| 4,905,451 A | 3/1990 | Jaconelli et al. |
| 5,013,595 A * | 5/1991 | Parry ............................. 428/77 |
| 5,531,393 A | 7/1996 | Salzsauler et al. |
| 5,565,222 A | 10/1996 | Scherer |
| 5,890,743 A | 4/1999 | Garrison |
| 2006/0090845 A1 | 5/2006 | Shimowaki |

FOREIGN PATENT DOCUMENTS

| CH | 644411 | 7/1984 |
| EP | A 638 505 | 2/1995 |
| EP | 0779145 | 6/1997 |
| EP | 1 022 131 | 7/2000 |
| EP | 1 095 759 | 5/2001 |
| EP | 1 201 406 | 5/2002 |
| EP | 1233 853 | 8/2002 |
| EP | 1291496 | 3/2003 |
| EP | 1 331 071 | 7/2003 |
| GB | 1509523 A * | 5/1978 |

(Continued)

*Primary Examiner* — Catherine A Simone
(74) *Attorney, Agent, or Firm* — Knobbe Martens Olson & Bear LLP

(57) ABSTRACT

The present invention relates to films with reinforced borders and edges which have a lower risk of the edges tearing during processing, to a method for producing such films, to a device for producing such films and to the use of such films.

14 Claims, 5 Drawing Sheets

(56) References Cited

FOREIGN PATENT DOCUMENTS

| | | |
|---|---|---|
| JP | A 50053464 | 5/1975 |
| JP | 01-056536 A | 3/1989 |
| NZ | 258070 | 4/1998 |
| SU | 722472 A3 | 3/1980 |
| WO | WO 95/15851 | 6/1995 |
| WO | WO 96 29203 | 9/1996 |
| WO | WO 9937555 A2 * | 7/1999 |
| WO | WO 01/60709 | 8/2001 |
| WO | WO 02/094674 | 11/2002 |
| WO | WO 02/096634 | 12/2002 |
| WO | WO 03/059750 | 7/2003 |
| WO | WO 2006/016393 | 2/2006 |
| WO | WO 2006/018028 | 2/2006 |

* cited by examiner

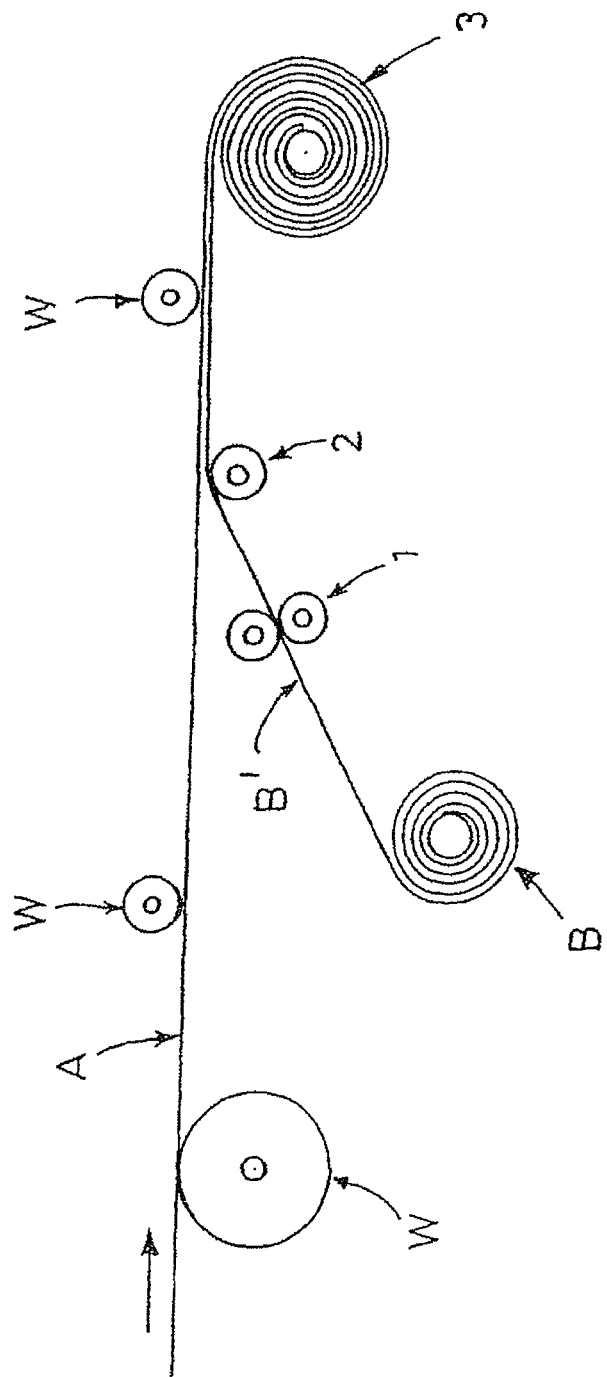

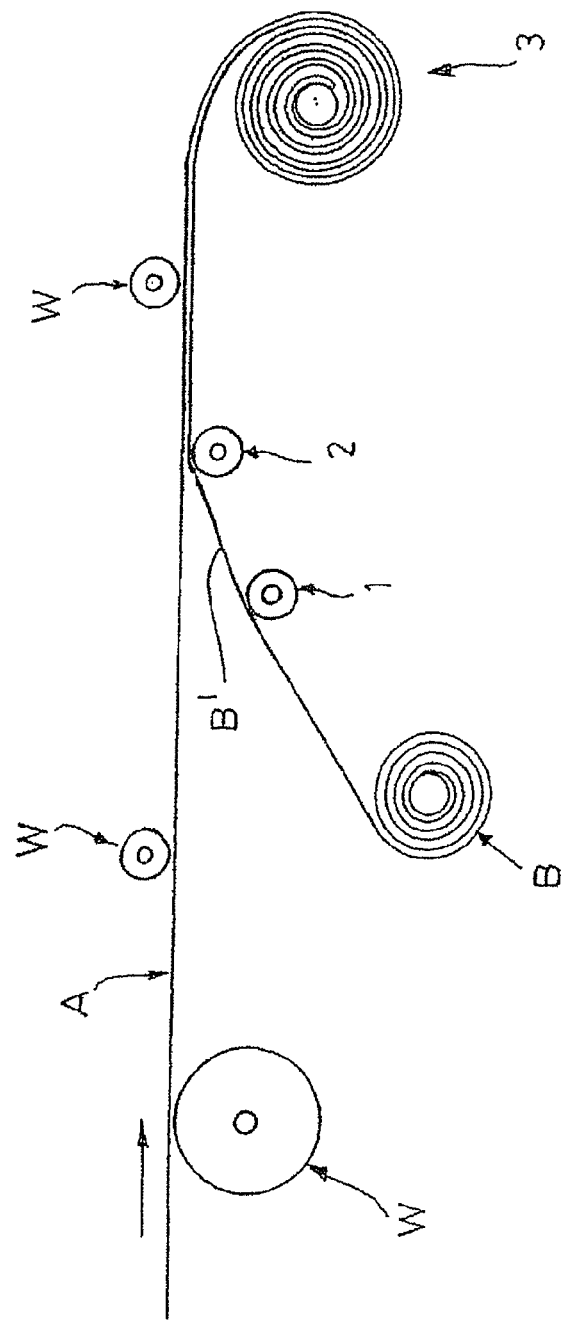

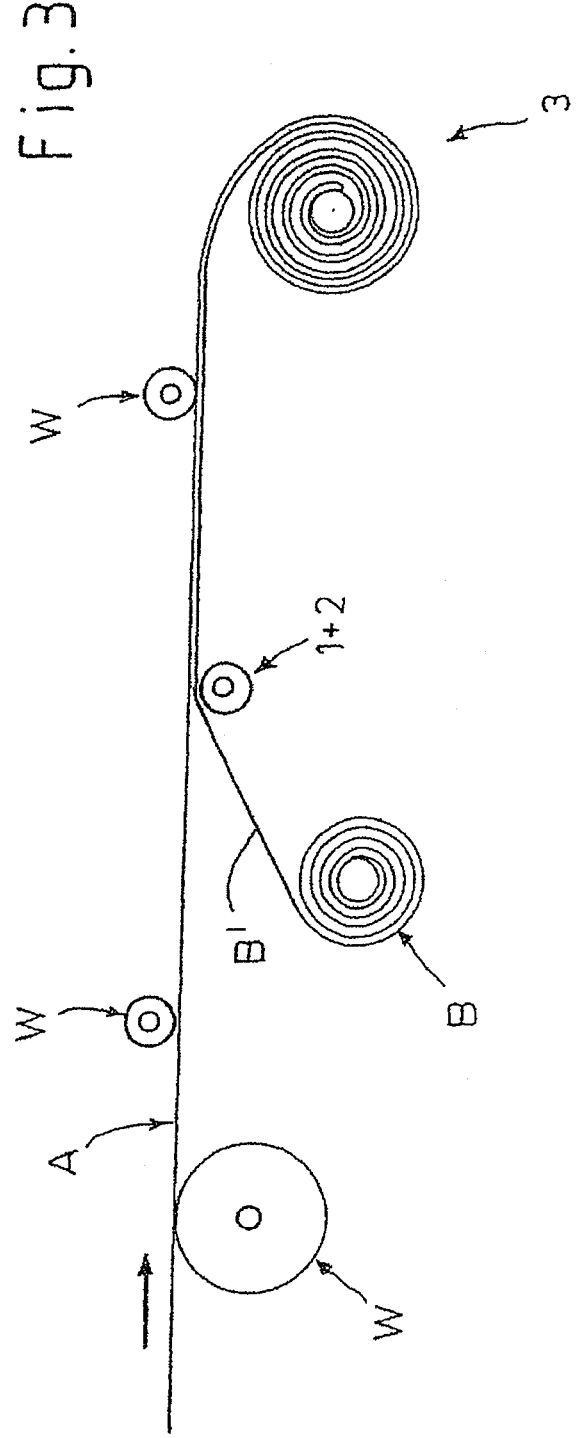

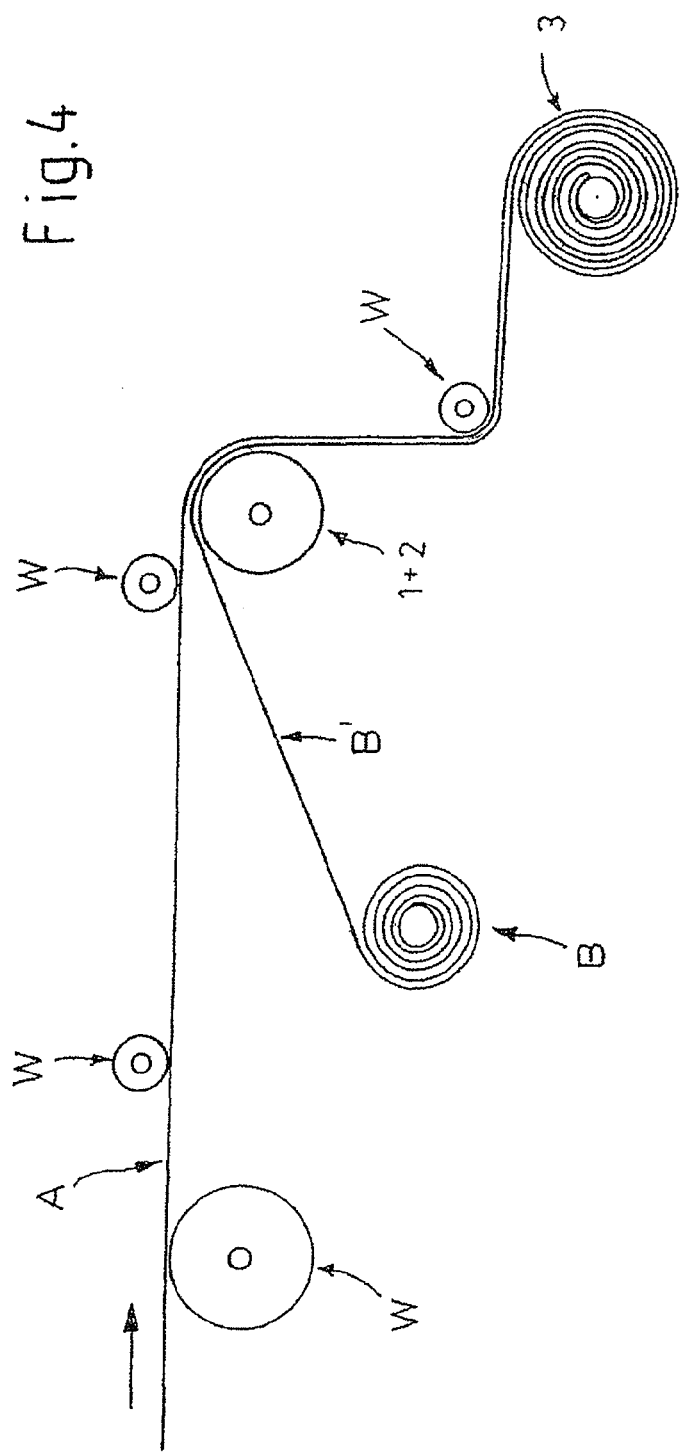

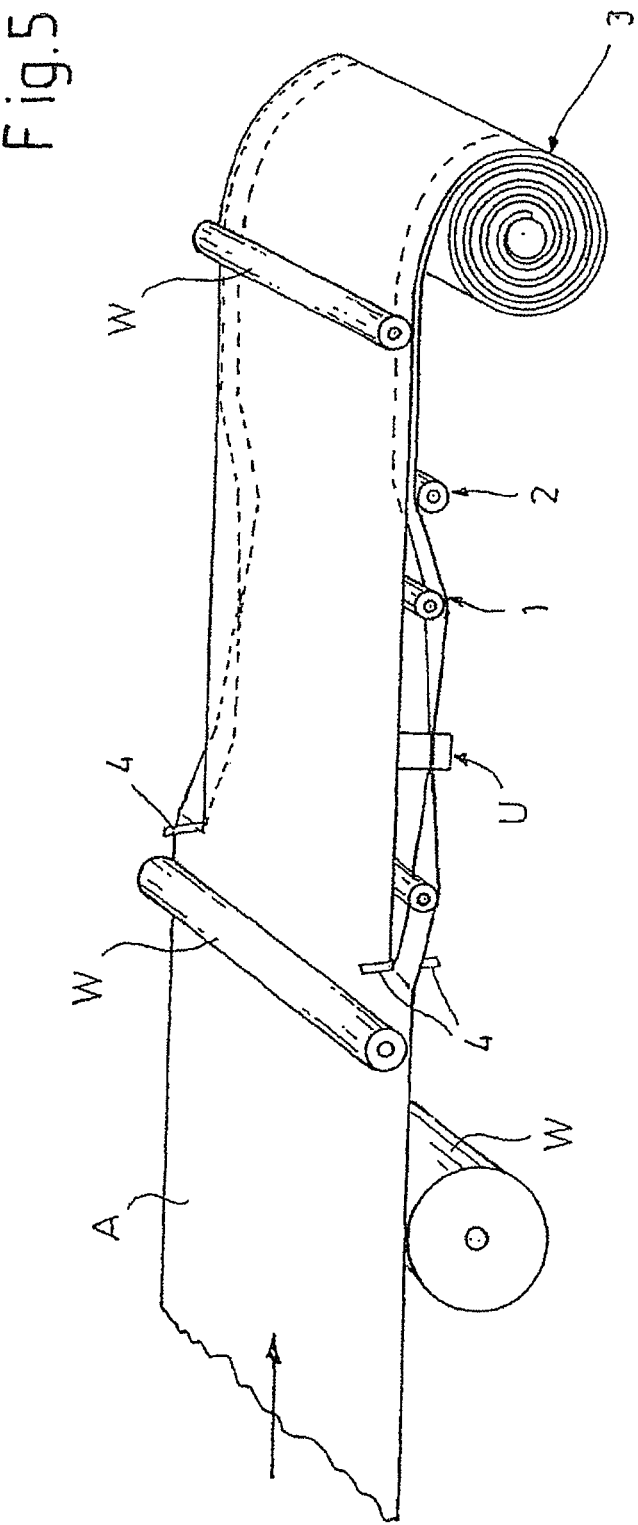

FILM WITH REINFORCED BORDERS AND EDGES

CROSS REFERENCE TO RELATED APPLICATIONS

This application claims the benefit and priority to and is a U.S. National Phase of PCT International Application Number PCT/EP2008/008476, filed on Oct. 8, 2008. This application claims the benefit and priority to European Application No. EP 07019778.5, filed on Oct. 10, 2007. The disclosures of the above-referenced applications are hereby expressly incorporated by reference in their entirety.

BACKGROUND OF THE INVENTION

Field of the Invention

The present invention relates to films with reinforced borders and edges which have a lower risk of the edges tearing during processing, to a method for producing such films, to a device for producing such films and to the use of such films.

In the case of stretch films, in particular pre-stretched stretch films, the edges at the side of a roll are in each case the most sensitive region. Minimal damage is often sufficient to cause edges and borders to tear during processing, even to tear off. Furthermore, there are problems if the film turns over and, as a consequence, there is adhesive side to adhesive side contact and/or if both sides of the film are adhesive, since the adhesion makes unrolling of the film more difficult and the edges and borders are possibly likewise damaged during unrolling.

To prevent the occurrence of defects at the edges, the approach chosen so far in the prior art has been primarily to fold over the film at the borders. This has the consequence that the sensitive edges of the film do not represent the outer delimitation of the film during processing, but are protected by the rest of the film lying on them. Such an approach is described in particular in U.S. Pat. No. 5,531,393, EP-A 638 505 and JP-A 5005 3464. All these documents teach folding over of the completed cold film at the borders and rolling up of said film in this state.

EP-A 1 095 759 likewise describes the production of a film in which the borders are folded over, but here the folded-over borders are additionally fixed in this state by heat sealing, in order to prevent unfolding of the folded-over edges during the later processing of the film.

U.S. Pat. No. 4,905,451 describes the folding of a stretchable film in the middle of the film, so that the film lies in multiple plies one on top of the other, in order to strengthen the film and thereby stabilize it.

The patent applications WO01/60709, WO03/059750 and WO2006/018028 describe a different approach to stabilizing films, in particular films which have multiple perforations on their surface. To be able to process films which have multiple perforations on their surface (for example films for air-permeable packagings), it is proposed to apply reinforcing strips between the perforations, giving the perforated film such stability that it can continue to be mechanically processed, preferably automatically processed.

The document CH 644 411 A5 discloses a sheet-like material web, such as wire mesh, gauze, tulle, tarpaulin, sailcloth and the like, which is strengthened in the border region by thermoplastic strips. For this purpose, strips are placed on both sides of the material web and are welded through existing mesh openings in the material web.

The document WO02/096634 A1 describes a reinforced plastic film which comprises reinforcing strips which are arranged at a distance from the borders of the film.

SUMMARY

The object of the present invention was to provide a film in which the edges are protected from mechanical influence in a simple and effective way during the production processes of the film. The production processes may comprise, in particular, the extrusion of the film or the casting of the film and further processing in the course of making up or further working.

This object is achieved by a method for producing a film with reinforced borders and edges in which a strip of a further film is respectively applied to the borders of the film in such a way that the film is at least double-ply at least in the region of the edges, a device for carrying out such a method and a film which has at each of the borders a strip of a further film which reinforces the edges of the film.

In connection with the present invention, "edges" of the film means the outer delimitation of the film on each side (side in the sense of right and left), in particular the outermost delimitation of the film (in the direction perpendicular to the plane of the film), while "borders" describe the regions of the film which are in the outer region of the film from the edges (perpendicular to the plane of the film) to the middle of the film. "Borders" are consequently to be understood as meaning the outer centimeters of the film in each case on its surface, for example the outer 10 cm in each case, preferably the outer 8 cm, more preferably the outer 5 cm, still more preferably the outer 3 cm. Particularly preferably, the term "borders" covers in each case at least the outermost 2 millimeters to 1 centimeter of the film. It should be understood here that, as far as the terms are concerned, an "edge" directly becomes a "border" as soon as the outermost region of the plane of the film is concerned.

The present invention is not restricted to a specific type of film, but it is preferred that the reinforcement of the borders and/or the edges is used in the case of films which are particularly sensitive at the edges, for example in the case of very thin films with a film thickness in the range from 5 to 100 µm. The reinforcement of the edges primarily serves the purpose of reducing the risk of tearing and damage. By applying the strip to the borders of the film, the respective edge of the film is "reinforced", so that the risk of damage under mechanical loading of the edges is reduced. The "reinforcement" of the edges is achieved by the film comprising multiple plies at the borders. If a strip is applied, the film is two-ply is in this region; if two strips are applied one on top of the other, it is three-ply, and so on.

In the present invention, a distinction should be made between "multi-ply" and "multi-layer". A "multi-ply" film comprises multiple plies of one film or different films of a particular construction. This involves at least two previously separate plies of one finished film or of different finished films being brought into contact with one another, thereby forming a "stack" of films. The chemical and/or physical properties of the individual (plies of the) film(s) may in this case coincide, or they may differ from one another. In the case of a "multi-layer" film, a film web consists of different layers, which together produce the film. Such multi-layer films are extensively known and described in the prior art; very often, for example, stretch films are such multi-layer films. According to the definition of the present application, a multi-layer film is any film that comprises more than one layer of a chemical material. In the prior art, films that are referred to as "multi-layer" on the basis of this definition are often also described as "multi-ply", but such films that come under this definition should be regarded as "multi-layer" irrespective of the prior-art definition. Examples of "multi-layer" films from the prior art are, for example, the films described in EP-A 1 201 406, EP-A 1 022 131, WO 95/15851, WO 96/29203 and many other applications, without being restricted to these. It should be appreciated from these statements that the multi-layer film represents an inseparable unit that comprises multiple layers, for example two, three, four, five or more layers. It goes without saying that multiple multi-layer films can be brought into contact with one another in multiple plies, for example two, three, four plies, and so on, in order to form a multi-ply film.

In a preferred embodiment, the film to be protected (hereafter "film to be protected" or simply just "film") is a stretch film, preferably a thermoplastic stretchable packaging film, in particular a stretchable packaging film with at least one adhesive side, that is to say for example a film with an adhesive side and a non-adhesive side, or else a film with two adhesive sides. Such films are generally also referred to as stretch wrapping films or wrapping films. Such films may be produced by casting ("cast films") or inflating ("blown films") the starting materials. The type of production of the films is immaterial for the aim of the present invention; rather, all films that have the problem of the edges tearing or tearing off when they are unwound from the roll during processing are suitable for the present invention.

Stretchable films which seal with themselves when parts thereof overlap are known as self-adhesive films. These films are generally multi-layer films and are used, for example, when it is desired to package items (for example by films on hand rolls) or to firmly hold together and/or package a group of items, such as for example in the case of palletizing consignments. For the palletizing of consignments, the film is wrapped closely around the product or the plurality of products located on the pallet and seals with itself as long as the film is in the stretched state, in order to create a secure packaging in units. The films used may be stored in a non-stretched state and in a pre-stretched state before being used as packaging material and, in the case of unstretched films, are stretched during the packaging operation. In this unrolling and stretching operation during the processing of the film, strong forces act on the edges of the film, to be specific, for example, forces of adhesion of the film to the film roll and forces of extension caused by the stretching of the film, which entail a risk of damage for the edges, in particular a risk of tearing or a risk of tearing off.

According to the present invention, this risk is countered by at least one separate strip of a further film (hereafter "strip") being applied to the borders of the film, the strip(s) reinforcing the edges of the film. In a particularly preferred embodiment, the strip(s) is/are applied in such a way that it/they finish(es) almost flush, as far as possible, with the edges of the film. This is achieved by the strip(s) being applied to the borders of the film in such a way that it/they reinforce(s) the edges of the film, by it/them either finishing almost flush, preferably flush, with the edges, or the strip(s) are applied to the film in such a way that it/they initially protrude(s) beyond these edges and the protruding part can subsequently be cut off if need be before the rolling up of the film.

The film that can be used for the strips may be any film that can also be used for the film to be protected. This means that the same type of film may be used for the strips, or else a different type of film that has properties suitable for the processing according to the present invention. The film used for the strips is preferably a stretchable film with an adhesive side and a non-adhesive side. In this case, it is preferred that the strips are brought into contact with the film in such a way that the adhesive side is facing the film. In the case where the film itself has an adhesive side and a non-adhesive side, it is preferred that the strips are applied on the adhesive side of the film. In the case where the film has two adhesive sides, strips may also be applied at the borders on both sides of the film, that is to say on the upper side and the underside. Apart from the effect of "thickening" the edges, the application of the strips has the additional effect that, at the borders and edges, the film that is located on the roll does not stick so much to the film still located on the roll. In the region of the borders and edges, the adhesive side is "masked" by the application of the strips, so that there the adhesion is greatly reduced. Consequently, the sensitive region is subjected to far less stress on account of the lower adhesion when the film is unrolled. The strips may also be applied on both sides of the film (in the sense of the upper side and the underside), but this is not preferred according to the invention, since such an embodiment would involve excessive material consumption.

In a preferred embodiment, the applied strips are made of a film material that has a very similar, preferably the same, coefficient of extension in the longitudinal direction as the film itself. Here it should be noted that strips that are more stretchable than the film itself can readily be used for the invention, while the use of strips that are less stretchable than the film during later processing is not preferred. In a particularly preferred embodiment, the applied strips consist of the same film material as the film itself.

According to the present invention, the strips may be applied to the film at any point in time during the working thereof. In one embodiment, the strips are, for example, applied to the film by a ready-produced film web that has already been rolled up on a roll being unrolled once again and the strips applied to the unwound film before it is wound up again without further working, or the strips are applied to the film before or after the film is additionally stretched and the film is subsequently rolled up again in order to be available in this form for further processing, for example for use as packaging material.

In a further preferred embodiment, the strips are applied to the film during the production processes, immediately after creation of the film (for example by extrusion or casting) or before said film is wound up onto a roll for the first time.

For being applied, the strips may be brought into the direct vicinity of the film in a previously defined position, for example with the aid of a feeding device, and then be fed together with said film to a deflecting roller, so that the film and the strips come into contact (at the latest) on the roller, or the strips may be brought into contact with the film directly with the aid of a feeding device, which if appropriate comprises a pressure-exerting element. The pressure-exerting element may, for example, be a small roller or an elastic material which protrudes in the direction of the film and is arranged in the device in such a way that it brings the respective strip into contact with the film. Like the film itself, the strips are preferably kept under a certain tension before contact with the film, in order to facilitate the guiding of the strips up until contact with the film.

In an embodiment in which the strips are applied after production of the film to be protected, that is to say in which the film is first unwound once again, then the strips are applied and then the film is wound up again, the feeding device or the pressure-exerting element is inserted into the arrangement at a suitable position before the renewed winding-up of the roll. In an embodiment in which the strips are applied during the production of the film, the feeding device is preferably part of the overall installation for producing the film and is preferably inserted into the overall installation at a suitable place before the winding-up of the film produced.

In a further embodiment of the invention, the installation comprises respectively after the feeding device and before the winding-up of the film a cutting device, which is suitable for cutting off if need be protruding borders of the strips, so that the edges of the strips finish flush with the edges of the film.

The advantage of the present invention over the method used from the prior art, in which the side borders of the film are folded over, is that on the one hand the film is subjected to far lower mechanical loading, since the film does not come into contact with a folding mechanism which must act directly on the film, and on the other hand strips can be attached to the edges of the film, preferably almost flush as far as possible, so that irregularities in the edge region that may arise due to imperfect folding over of the borders of the film are avoided. For example, it is possible when folding over the borders that air becomes trapped, or the film comes into contact with itself too early, which leads to the film's own borders lying imprecisely on it. In the case of the embodiment according to the invention, such imperfections can be avoided. A further advantage is that, by providing a multi-ply effect in the region of the borders on the film, the method according to the invention produces a multiple edge, for example a double edge, which may have greater strength values in comparison with a simple edge, so that damage or tearing of the film can be reduced. This advantage is also achieved in the case of strips applied slightly offset in relation to the edge, so that it is not absolutely necessary for the strips to be applied completely in register with the edge, even though it is preferred for the strips to finish (at least almost) flush with the film.

During the process of producing films, usually a strip is cut off in each case at the borders of the film after the extrusion or casting, in order to ensure the formation of clean edges. From wide films, a so-called "middle cut" is also usual, i.e. from wide films a strip is cut out from the middle of the film web. Previously, cut-off strips obtained in this way have usually been discarded as unavoidable scrap.

According to the invention, the strips cut off from the film may be wound up on rolls for later use. It goes without saying that other strips apart from those from the film production of the same film may also be used for the method according to the invention. Consequently, in one embodiment of the invention the strips are on rolls before being fed to the film and may likewise be stored as such in an unstretched or pre-stretched state. In order to bring about the contact of the strips with the film, the beginning of a strip located on the roll is detached and brought into contact with the film by means of the feeding device.

DETAILED DESCRIPTION

In one embodiment (represented in FIG. 1), the feeding device (1) may, for example, comprise two rollers which are in contact with one another and are driven in such a way that they draw off the strip (B') from the supply roll (B) and pass the strip (B') on in the direction of the film web (A). Alternatively, the feeding device (1) may also comprise just a single roll or roller, over which the strip (B') is passed in the direction of the film web (A), which is positioned in such a way that, after making contact with the film, the strip (B') is unwound of its own accord from the supply roll by the running movement of the film web (A), that is to say for example directly above or below the film web (A) respectively at the border of the film running thereunder or thereover (represented in FIG. 2). In this embodiment it is preferred, but not necessary, that the roller or roll is designed in such a way that the strip (B') can be positioned on it with great accuracy, for example in that at the borders of the roll/roller there is, if required, at least one stop or there are forms of side edge controls or regulators, which prevents/prevent "slipping" of the strip (B') on the roll/roller.

The arrangement also preferably comprises a pressure-exerting element (2), which brings the strip into contact with the film. This pressure-exerting element (2) may likewise be a roll or roller, which is positioned in such a way that it presses the strip (B') against the film at a desired position. In one possible embodiment, the roll or roller may have on the outer side, that is to say on the side which runs against the edge of the film web, a stop or collar, adjacent to which are both the film web (A) and the applied strip (B'). For example, in this way the strip (B') can be positioned in relation to the film web (A) such that it finishes flush with the edge of the film. Alternatively, there may be, for example, forms of side edge controls or regulators which ensure that the film and the strips lie one on top of the other. However, such a stop or collar or such controls or regulators are not a necessary feature for a device according to the invention. A further embodiment of the pressure-exerting element (2) may be an elastic material, which however has such an inherent stress that it is capable of pressing the strip (B') against the film web (A) with such a force that the strip comes into contact with the film. In this embodiment, the pressure-exerting element (2) may be, for example, a small sprung guiding roller or a small flexible plate, one end of which is restrained in a position which allows the desired positioning of the strip (B') on the film web (A) and the other end of which presses the strip (B') against the film web (A). Preferably, the upper side of such a small plate is covered with a material which brings about the lowest possible mechanical effect on the strip, for example with a nonwoven, felt, a soft plastic or the like. It is also preferred in this embodiment that on the pressure-exerting element (2) there is a collar or a stop on the side that lies against the edge of the film web (A), in order to allow exact positioning of the strip (B') on the film web. Here, too, there is the aforementioned possibility of controlling or regulating the positioning of the strips, without one of these measures having to be absolutely necessary for the invention.

In one embodiment according to the invention (represented in FIG. 3), the feeding device (1) and the pressure-exerting element (2) also functionally coincide, i.e. both functions may be realized in one component, for example in the form of a single roll or roller which is positioned in such a way that it brings the strip (B') that is fed from the supply roll (B) directly into contact with the film web (A). In this embodiment, for example, the supply roll (B) of the strip is positioned directly under or above the running film web and the unwound strip (B') comes into contact directly with the film web (A) by means of a single roll or roller.

The above statements should be understood such that, for the provision of a strip at each border of the film, one of the devices described is respectively positioned on each bordering side of the film web.

In a further embodiment (represented in FIG. 4), the feeding device (1) (=pressure-exerting element) may also be a deflecting roller, which lies completely under the entire width of the film web and by means of which the film web (A) and the strips (B') are brought together. In this case, the strips (B') come into contact with the film web (A) when they together pass the deflecting roller. In the case of this embodiment, a lateral delimitation on the deflecting roller may likewise ensure that the strips (B') finish flush with the edge of the film.

The aforementioned controlling or regulating alternatives for the positioning of the strips on the film are also possible here, but not necessary.

In each of the embodiments described it is possible to dispense with a lateral collar or a lateral stop on the feeding device or the pressure-exerting element. In this case, it may happen that the strips are also applied in such a way that they are not flush with the edge of the film. In such a case, it is possible and preferred, but not necessary, that the installation comprises before the device winding up the film web onto a roll a cutting device, which cuts off regions of the strips protruding beyond the edge of the film.

In the embodiments which do not have a separately driven feeding device, the unwinding of the strip (B') from the supply roll (B) takes place by the continued running of the film web (A) in the production process. In the method and the arrangement according to the invention, it is preferred that the feeding device is not separately driven.

It is expressly pointed out that, in the figures shown, although the feeding of the strip(s) is respectively shown from below, feeding from the other side of the film is likewise possible and in keeping with the invention. In the case where strips are applied on the upper side and underside of the film, feeding of the strips may also take place from the upper side and the underside of the film.

The application of the strips to the film takes place either in the process of producing the film, before it is wound up for the first time in the form of a roll, or on a completed film that has already been wound up once, in that it is unrolled once again, the strips are applied and the film is subsequently rolled up again. During this working, further working steps may be carried out, such as for example the stretching (extending) of the film.

In a further embodiment of the method according to the invention (an arrangement is shown by way of example in FIG. 5), the strips (B') cut off after the extrusion/casting of the film are used directly without first being wound up onto a roll, in order to apply them by the method according to the invention to the borders of the film during the production processes. For this, strips may be cut off at the borders of the film, for example with the aid of a cutting device (4), and the strips fed with the aid of a deflecting device (U) to the film web (A) in such a way that they can lie against the film in the desired orientation and positioning. For this it is again possible—but not obligatory—for a feeding device (1) and/or a pressure-exerting element (2) to be included in the arrangement. If, for example, a strip is cut off from a film with an adhesive side and a non-adhesive side, it is preferably turned over once, for example with the aid of a suitable deflecting device (U), which brings about a reversal of the sides of the strip, and applied again to the film even before the film is wound up onto the roll, in that the adhesive side of the strip is brought into contact with the adhesive side of the film. In the case of this embodiment, the strips consist of the same material as the film. This ensures that the film and the strips have the same coefficient of extension in the longitudinal direction, so that no differences in stress between the film and the strip occur during later processing or use.

In the case of this embodiment, an arrangement for producing the film comprises at least one device for cutting off strips (4) from the borders of an extruded or cast film, preferably, but not necessarily, a reversing device (U), which is suitable for the purpose of turning over the cut-off strip(s) in such a way that the former upper side of the strip (corresponding to the upper side of the film) becomes the underside, if appropriate a feeding device (1), it being possible for this to coincide functionally with the reversing device (U), and preferably a pressure-exerting element (2), which may be constructed in the way described above for FIGS. 1 to 4.

A film produced by one of the embodiments described takes the form of a non-stretched or pre-stretched film which has at each of both its borders a strip of a further film, which is either of the same type of film or of a different type of film, the strips preferably adhering permanently to the film and strengthening the edges of the film.

The applied strips may have the same film thickness as the film itself, or they may be thicker or thinner, for example in order to achieve a desired set of properties by systematic influencing. Preferably, the applied film strips are at most of the same thickness as the film, or preferably the applied strips are thinner than the film. The width of the strips is preferably as defined above for the "borders" of the film.

The film as such is preferably a completely closed film web which does not have any perforations or imperfections and—after application of the strips—is preferably provided in the form of film rolls. It goes without saying that further processing of the film does not exclude perforation of the film, but this is not preferred according to the invention.

A preferred type of film is a multi-layer stretch film which has an adhesive side and a non-adhesive side, as used for the packaging of items. Such types of film are described, for example, in EP-A 1 201 406, EP-A 1 022 131, WO 95/15851, WO 96/29203. Each of the types of film described there may preferably be provided according to the present invention with strips at the borders, in order to avoid damage to the edges of the film during unwinding, but the invention is expressly not restricted to the types of film described there. Rather, any film web that has the problem of tearing of the edges during unwinding and processing may be worked according to the present invention.

BRIEF DESCRIPTION OF THE DRAWINGS

The figures show various embodiments of the arrangements for producing a film with reinforced borders and edges. Shown in each of the figures is an arrangement of rolls or rollers (W) for guiding the film web (A), a supply roll (B) of the strips (B'), which are applied to the film, a feeding device (1) for feeding the strips, a pressure-exerting element (2) and a roll of the completed product (3), to be specific of the film with the applied strips. Also shown in FIG. 4 is a cutting device (4), which cuts off strips at the borders of the film.

Shown in FIG. 1 is an embodiment in which the feeding device (1) comprises two driven rolls or rollers and also a pressure-exerting element (2).

FIG. 2 shows an embodiment in which the feeding device (1) comprises a single, non-driven roll or roller; a pressure-exerting element (2) is also shown.

FIG. 3 shows an embodiment in which the feeding device (1) and the pressure-exerting element (2) functionally coincide in a roll or roller.

Represented in FIG. 4 is an embodiment in which the contact of the strips (B') with the film web takes place on a deflecting roller (1)+(2), in which the functions of the feeding device and the pressure-exerting element coincide.

Shown in FIG. 5 is an embodiment in which, during the process of producing the film, strips are cut off from the borders of the film with the aid of a cutting device (4) directly after the extrusion/casting of the film and the cut-off strips are brought into contact with the film again without first being wound up onto a roll. For this, the strips may be fed to the film web (A) with the aid of a deflecting device (U) in such a way that they can lie against the film in the desired orientation and positioning.

EXAMPLES

Example 1

Tensile Strength

Specimens of three-layer polyethylene films (adhesive layer/core layer/nonstick layer) each 500 mm wide and 20 μm thick are respectively subjected to a tensile strength test according to DIN EN ISO 527-3, once with strips (each 15 mm wide, 20 μm thick; specimen nos. 1 to 4) and once without strips (specimen nos. 5 to 8). The test is carried out in each case with n=4 specimens. Restrained length of the film 100 mm, force transducer Fmax 200 N, initial force 0.1 N, testing rate 500 mm/min.

Table 1 shows the values obtained for the elongation at tear of the film and the force expended until the film tears.

TABLE 1

| Specimen No. | Stretching force until tearing [N/mm$^2$] | Elongation at tear [%] |
|---|---|---|
| 1 | 58.29 | 627.83 |
| 2 | 59.87 | 634.58 |
| 3 | 52.00 | 562.83 |
| 4 | 62.75 | 631.83 |
| 5 | 41.36 | 489.91 |
| 6 | 33.63 | 387.33 |
| 7 | 34.50 | 425.75 |
| 8 | 29.43 | 411.75 |

As can be seen from the results, the strips provided at the borders of the film stabilize the film in such a way that they allow much greater stretching before tearing (tearing of the borders and consequently tearing off of the film).

Example 2

Determination of the Detachment Resistance of the Film from the Roll

Three-layer polyethylene stretch films (adhesive layer/core layer/nonstick layer) each 500 mm wide and 20 μm thick are respectively subjected to a detachment resistance test according to ASTM D 5458, 1995, once with strips (each 1 inch=25.4 mm wide, 20 μm thick; specimen nos. 1 to 4) and once without strips at the borders (specimen nos. 5 to 7). Force transducer Fmax 200 N, conditioning >24 h at 23° C., specimen pre-stretching 0%.

Table 2 shows the values obtained for the detachment force for the film in g/inch

TABLE 2

| Specimen No. | $F_{cling}$ [g/inch] |
|---|---|
| 1 | 101.60 |
| 2 | 92.81 |
| 3 | 107.54 |
| 4 | 98.81 |
| 5 | 57.15 |
| 6 | 45.05 |
| 7 | 35.96 |

The data obtained show that the detachment force is greatly reduced by applying the strips to the borders of the film, which brings about lower loading of the film and, in particular, the borders of the film.

The invention claimed is:

1. A stretch film with reinforced edges and/or borders, the stretch film having first and second sides, at least one side being adhesive, said film having at the borders on at least one of said sides at least one strip of a further film, so that the borders of the film are multi-ply, the strips terminating almost flush as far as possible with the edges of the film.

2. The stretch film as claimed in claim 1, wherein the film and the strips have the same coefficient of extension in the longitudinal direction or the strips are more extendable than the film.

3. The stretch film as claimed in claim 1, wherein the strips are provided on said at least one adhesive side.

4. The use of the stretch film as claimed in claim 1 for packaging items and / or for further working or making up, wherein said film is used to package items with said film in a stretched state.

5. The stretch film as claimed in claim 1, wherein one of said sides is adhesive and the other side is non-adhesive.

6. The stretch film as claimed in claim 1, wherein the film is in a pre-stretched state.

7. A method for producing the stretch film according to claim 1 in which, during the process of producing said film, before it is rolled up for the first time, the strip of the same film is respectively applied to the borders of the film in such a way that the film is at least double-ply at least in the region of the edges, wherein the strips are applied in such a way that the strips terminate almost flush as far as possible with the edges of the film.

8. The method as claimed in claim 7, wherein the strips of the further film have in each case an adhesive side and a non-adhesive side and the adhesive side comes into contact with the film to be protected.

9. The method as claimed in claim 7, wherein the strips are applied on the upper side and/or underside of the film to be protected immediately after creation of the film, before it is wound up for the first time.

10. The method as claimed in claim 8, wherein the adhesive side of the film comes into contact with the adhesive side of the strips.

11. The method as claimed in claim 7, wherein the film and the strips have the same coefficient of extension in the longitudinal direction.

12. The method as claimed in claim 7, wherein strips are cut off at the borders of the film immediately after the casting or extrusion of the film, if appropriate the strips are turned over and are brought into contact again with the film even before it is rolled up for the first time.

13. A device for producing the stretch film with reinforced edges as claimed in claim 7, wherein the device comprises an arrangement of rolls for guiding a film web and at least one feeding device for film strips before a winding-up device for the film, the device additionally comprises a cutting device for removing protruding borders, which form the film strips, and a stop or some other form of side edge control or regulation.

14. The device as claimed in claim 13, wherein the feeding device(s) for the film strips is/are positioned in such a way that the film strips can be applied at the borders of the film.

* * * * *